(12) United States Patent
Shafto et al.

(10) Patent No.: US 10,632,380 B2
(45) Date of Patent: Apr. 28, 2020

(54) BODY MOTION DRIVEN INTERFACE SYSTEM

(71) Applicant: Champlain College, Burlington, VT (US)

(72) Inventors: Robin Shafto, Livingston, NJ (US); Kenneth Wayne Howell, Essex Junction, VT (US); Terrence William Sehr, South Burlington, VT (US); Devin Carlin, New Rochelle, NY (US); Steven Margolin, Burlington, VT (US); John Robert Pierce, Solon, OH (US); Jacob Mushlin, Burlington, VT (US)

(73) Assignee: CHAMPLAIN COLLEGE INCORPORATED, Burlington, VT (US)

( * ) Notice: Subject to any disclaimer, the term of this patent is extended or adjusted under 35 U.S.C. 154(b) by 77 days.

(21) Appl. No.: 15/950,357

(22) Filed: Apr. 11, 2018

(65) Prior Publication Data

US 2019/0070501 A1 Mar. 7, 2019

Related U.S. Application Data

(60) Provisional application No. 62/554,731, filed on Sep. 6, 2017.

(51) Int. Cl.
*A63F 13/428* (2014.01)
*A63F 13/211* (2014.01)
(Continued)

(52) U.S. Cl.
CPC .......... *A63F 13/428* (2014.09); *A63F 13/211* (2014.09); *A63F 13/212* (2014.09);
(Continued)

(58) Field of Classification Search
CPC . A63B 69/36; A63B 67/14; A63F 7/24; A63F 13/428; A63F 13/211; A63F 13/212; A63F 13/218; A63F 13/235; A63F 13/24; A63F 13/285; A63F 13/52; A63F 13/57; A63F 13/803; G06F 3/011; G06F 3/0334
See application file for complete search history.

(56) References Cited

U.S. PATENT DOCUMENTS

| 4,817,950 A | 4/1989 | Goo |
| 5,405,152 A | 4/1995 | Katanics et al. |

(Continued)

*Primary Examiner* — William H McCulloch, Jr.
*Assistant Examiner* — Yingchuan Zhang
(74) *Attorney, Agent, or Firm* — Thomas G. Ference

(57) ABSTRACT

A body motion driven interface system, the system uses an interface to track body position along with optional body positional elements driven by the user's body. The body motion driven interface includes an interactive object, a rocking platform for supporting the user's body, a tilt sensor for sensing tilt of the rocking platform, an optional position sensor for sensing position of the body positional elements relative to the rocking platform, and an optional tactile sensor for sensing touch of the body. The system further includes a control unit receiving tilt sensor data from the tilt sensor, position sensor data from the position sensor and tactile sensor data from the tactile sensor. The control unit uses the tilt sensor data, the position sensor data and the tactile sensor data to generate instructions that change a state within the computer driven visual display to create an imagination driven simulated reality.

40 Claims, 14 Drawing Sheets

(51) Int. Cl.
*A63F 13/218* (2014.01)
*A63F 13/235* (2014.01)
*A63F 13/24* (2014.01)
*A63F 13/285* (2014.01)
*A63F 13/803* (2014.01)
*A63F 13/52* (2014.01)
*A63F 13/57* (2014.01)
*A63F 13/212* (2014.01)
*G06F 3/01* (2006.01)

(52) U.S. Cl.
CPC .......... *A63F 13/218* (2014.09); *A63F 13/235* (2014.09); *A63F 13/24* (2014.09); *A63F 13/285* (2014.09); *A63F 13/52* (2014.09); *A63F 13/57* (2014.09); *A63F 13/803* (2014.09); *G06F 3/011* (2013.01); *G06F 3/016* (2013.01)

(56) References Cited

U.S. PATENT DOCUMENTS

| | | |
|---|---|---|
| 5,613,690 A | 3/1997 | McShane et al. |
| 5,813,864 A | 9/1998 | Ikuta |
| 5,860,861 A | 1/1999 | Lipps et al. |
| 5,913,727 A | 6/1999 | Ahdoot |
| 6,002,272 A | 12/1999 | Somasekhar et al. |
| 6,059,666 A | 5/2000 | Ohara et al. |
| 6,120,375 A | 9/2000 | Takahashi |
| 7,614,987 B2 | 11/2009 | Guadagno |
| 8,277,327 B2 | 10/2012 | Takeda |
| 8,460,104 B1 | 6/2013 | Snyder et al. |
| 8,517,835 B2 | 8/2013 | Dwyer et al. |
| 9,101,831 B2 | 8/2015 | Sauerbrei et al. |
| 9,295,911 B2 | 3/2016 | Claudel |
| 9,504,909 B2 | 11/2016 | Persaud et al. |
| 2002/0055422 A1 | 5/2002 | Airmet et al. |
| 2007/0155495 A1 | 7/2007 | Goo |
| 2013/0130798 A1 | 5/2013 | Nir et al. |
| 2014/0035888 A1 | 2/2014 | Levasseur et al. |

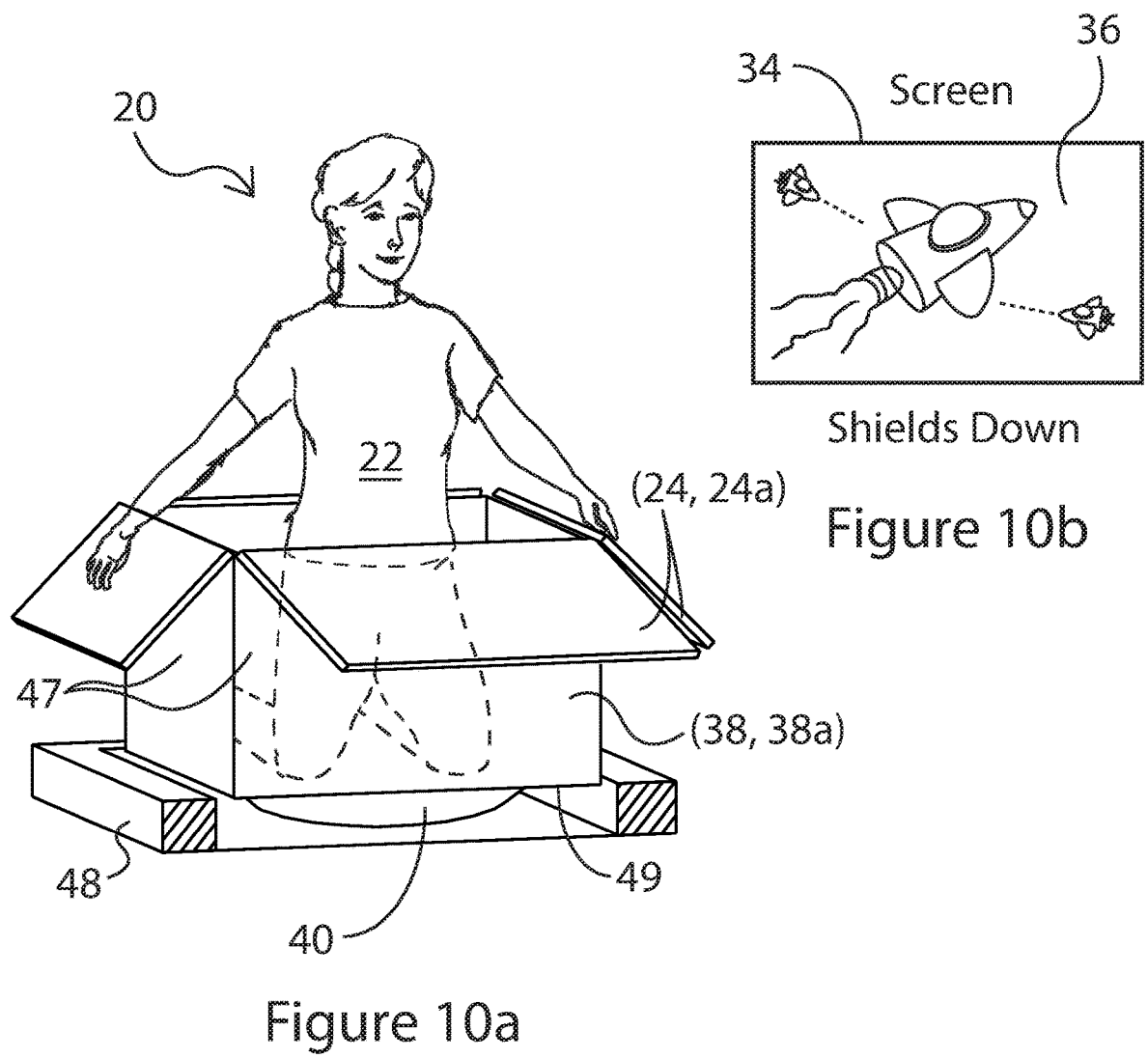

BODY MOTION DRIVEN INTERFACE SYSTEM

RELATED APPLICATIONS

This application claims the benefit of priority of U.S. Provisional Patent Application No. 62/554,731, filed Sep. 6, 2017, which is herein incorporated by reference.

FIELD

The present invention generally relates to an interface between a user and a computer driven visual display. More specifically, the invention relates to a body motion driven interface that includes a rocking platform for supporting the user's body, the rocking platform and the user's body movements are tracked with tilt, position and tactile sensors that then allow the user to turn an interactive object into an imagination driven journey experienced on the visual display.

BACKGROUND

In the field of computer-mediated experiences, such as electronic games or interactive artworks, the interfaces used to communicate a user's motions to the computer are most often designed to either: capture a singular or narrow set of motions, such as with a mouse, keyboard, handheld game controller; or they are highly tuned sensing devices—to detect fixed position of a particular body part, either full- "skeleton" or individual digits and joints of the hand. Another class of computer mediated experiences is designed to simulate in high detail a specific vehicle, such as an airplane cockpit or race car where the devices used to communicate with the computer are exactly what the user would use in the real-world vehicle. None of these interfaces has been able to provide a means of open-ended, imaginative play, such as that experienced by a child where the child can turn an ordinary cardboard box into a spaceship one minute, and then a submarine or toboggan the next minute.

The present invention aims to provide for a body motion driven interface that can "become" a variety of vehicles, containers or platforms required by the computer-mediated experience.

SUMMARY

In one implementation, the present disclosure is directed to a body motion driven interface system that uses a user's body position along with an optional body positional element driven by the user's body to effect a change of state within a computer driven visual display. The interface comprises a rocking platform for supporting the user's body, a tilt sensor for sensing tilt of the rocking platform, an optional position sensor for sensing position of the body positional element relative to the rocking platform, and an optional a tactile sensor for sensing instructions initiated by contact of the body with the tactile sensor. The interface further comprises a control unit that receives tilt sensor data from the tilt sensor, position sensor data from the positioning sensor, and tactile sensor data form the tactile sensor. The control unit uses the tilt sensor data, the position sensor data and the tactile sensor data to generate instructions that effect the change of state within the computer driven visual display.

In another implementation, the present disclosure is directed to a body motion driven interface system that uses a user's body position along with an optional body positional element driven by the user's body to effect a change of state within a computer driven visual display. The interface comprises a rocking platform for supporting the user's body. The rocking platform has a front, back and a rocking center point. The rocking center point is displaced off center of said rocking platform towards the front to provide an asymmetric ergonomic rocking surface. The system further comprises a tilt sensor for sensing tilt of the rocking platform. The interface further comprises a control unit that receives tilt sensor data from the tilt sensor. The control unit uses the tilt sensor data to generate instructions that effect the change of state within the computer driven visual display.

BRIEF DESCRIPTION OF DRAWINGS

For the purposes of illustrating the invention, the drawings show aspects of one or more embodiments of the invention. However, it should be understood that the present invention is not limited to the precise arrangements and instrumentalities shown in the drawings, wherein:

FIG. 3a is perspective view of one embodiment of the body motion driven interface in FIG. 1;

FIG. 3b is an exploded view of the body motion driven interface in FIG. 3a;

FIG. 4b is a side view of the rocking platform in FIG. 4a;

FIG. 4c is a bottom plan view of the rocking platform in FIG. 4a;

FIG. 5d is a bottom plan view of the rocking platform in FIG. 5a;

FIG. 6b is a bottom plan view of the rocking platform in FIG. 6a;

FIG. 10a is a perspective view of one embodiment of the body motion driven interface of FIG. 1 with a user in a first state;

FIG. 10b is a schematic view of a computer driven visual display depicting the state associated with the position of the user in FIG. 10a;

FIG. 11a is a perspective view of one embodiment of the body motion driven interface of FIG. 1 with a user activating a change of the state in FIG. 10a;

FIG. 11b is a schematic view of a computer driven visual display depicting the state associated with the position of the user in FIG. 11a;

FIG. 12a is a perspective view of one embodiment of the body motion driven interface of FIG. 1 with a user activating a change of the state in FIG. 11a;

FIG. 12b is a schematic view of a computer driven visual display depicting the state associated with the position of the user in FIG. 12a;

FIG. 13b is a schematic view of a computer driven visual display depicting the state associated with the position of the user in FIG. 13a;

FIG. 14a is a perspective view of one embodiment of the body motion driven interface of FIG. 1 with a user activating a change of the state in FIG. 13a; and FIG. 14b is a schematic view of a computer driven visual display depicting the change of state associated with the position of the user in FIG. 14a.

DETAILED DESCRIPTION

Figure 1:
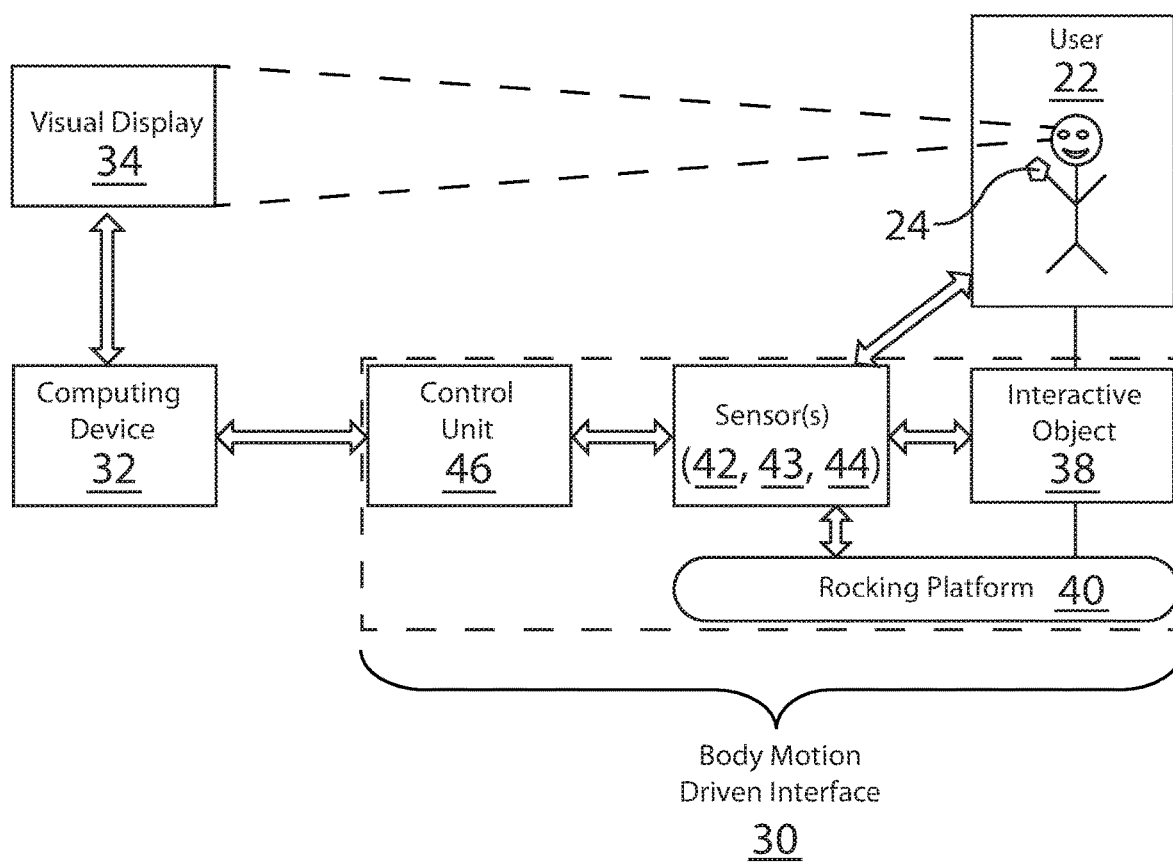
FIG. 1 is a schematic diagram illustrating one exemplary embodiment of the body motion driven interface system.
Figure 2:
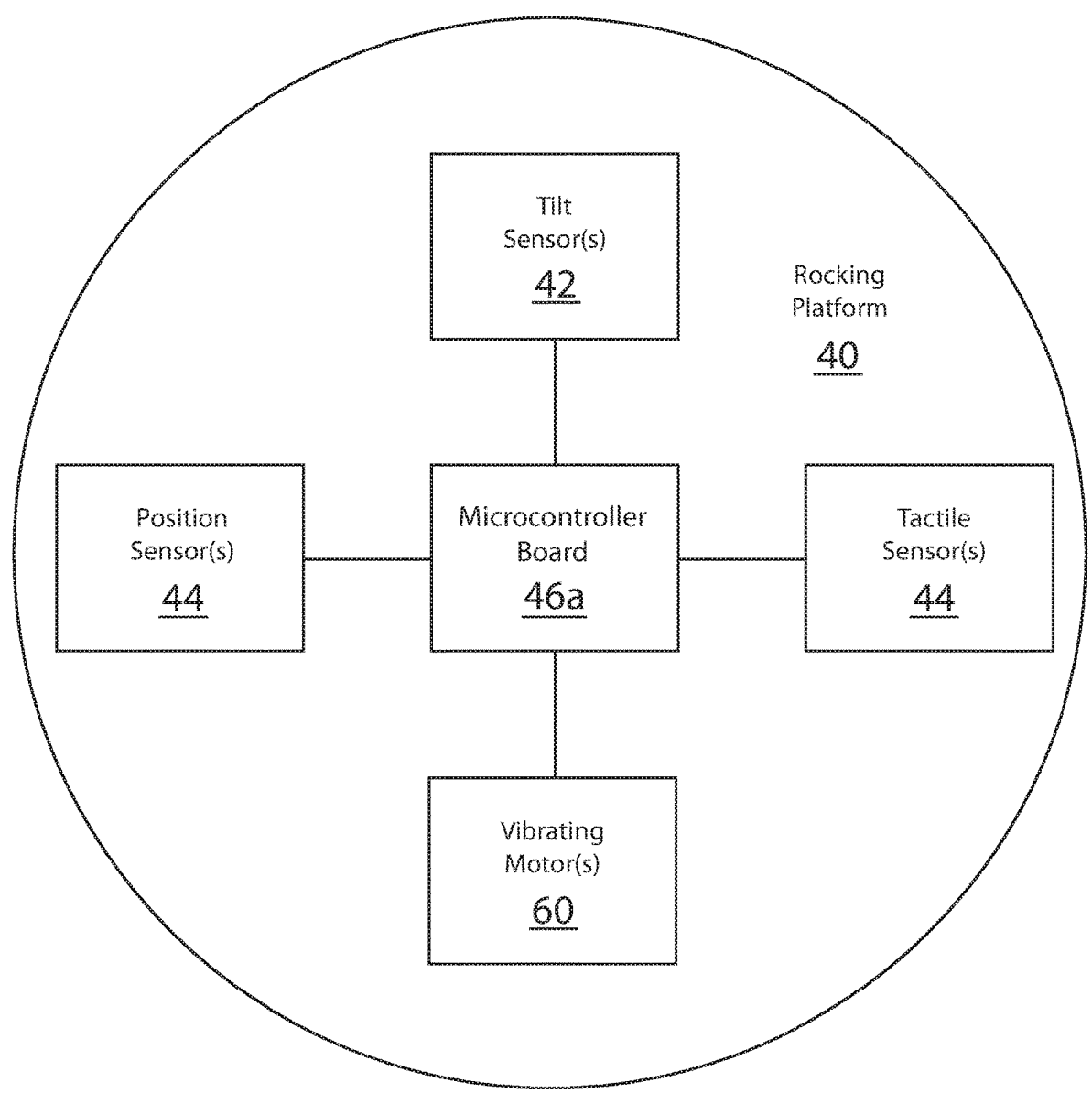
FIG. 2 is a schematic diagram illustrating one embodiment of the control unit for the interface in FIG. 1 with sensors and rocking platform.

A body motion driven interface system 20 that uses a user's body 22 position along with optional body positional elements 24 is illustrated in FIGS. 1-14b. System 20 comprises body motion driven interface 30 that communicates with a computing device 32. Computing device 32 drives computer driven visual display 34. User 22 can become part of system 20 and view change of state 36 that are a result of interaction of the user's body with body motion driven interface 30. User 22 can therefore effect change of state 36 within computer driven visual display 34. Body motion driven interface system 20 has the ability to take imaginative play generated within the mind of user 20 and realize this play through body movements that turn an interactive object 38 (such as a box 38a, carpet 38b, pillow, etc.) into a vehicle 40 (such as spaceship, magic carpet, cloud, etc.) that then is simulated within computer driven visual display 34.

Body motion driven interface 30 comprises rocking platform 40 for supporting user's body 20. Body motion driven interface 30 further comprises tilt sensor 42 for sensing tilt of rocking platform 40. Body motion driven interface 30 may further comprise position sensor 44 for sensing position of body positional element 24 relative to the rocking platform and tactile sensors 43 for sensing touch of user 22. Body motion driven interface 30 further comprises control unit 46 that receives tilt sensor data from tilt sensor 42, positional sensor data from position sensor 44 and tactile sensor data from tactile sensor 43. Control unit 46 uses said tilt sensor data, said position sensor data, and tactile sensor data to generate instructions that effect change of state 36 within computer driven visual display 34.

Interactive objects 38 may interface user's body 22 with rocking platform 40. A cradling support element 48 may be provided for supporting interactive object 38. Interactive object 38 is preferably an ordinary everyday object. The intent of interactive object 38 as an everyday item such as a cardboard box 38a or a rug 38b is to encourage and facilitate imaginative play. Pairing the everyday object with representations on computer driven visual display 34 enables the player (a.k.a. user 22) to imagine box 38a as a spaceship, or rug 38b as a magic carpet, etc. Additionally, when imagining cardboard box 38a as a spaceship, the player may use box flaps 24a as body-positional element 24, the position of which are tracked by sensors 44, therefore the flaps become an imaginary shield protecting the spaceship. Or, one or more tactile sensors 43 on flap 24a may transmit touch signals to control unit 46, such that the player can tap the tactile sensor, firing an imagined weapon in the spaceship. When using cardboard box 38a as interactive object 38, cardboard box may be open at the top, and may have three or four vertical walls 47 and a horizontal box floor 49. Box should be large enough to contain user 22 sitting, standing or kneeling. The box may have one or more foldable flaps 24a attached to vertical walls 47. Flaps 24a may be folded outward and down from tops of vertical walls 47. User 22 may reach out of box 38a to grasp and move one or more flaps 24a, changing angle of orientation of the flap with respect to cardboard box vertical walls. Motion of flaps 24a is tracked by position sensors 44. Cardboard box 38a may be modified by user 22 in various ways to enhance imaginative play. In one embodiment, user 22 may mark inside surfaces and may mark outside surfaces of box using paints, inks, crayons, stickers, and other decorative materials. User 22 may cut holes and otherwise carve the various box surfaces (24a, 47). Cardboard box 38a may be replaced at low cost, allowing users 22 freedom to experiment with modifications to enhance imaginative play.

Figure 4A:
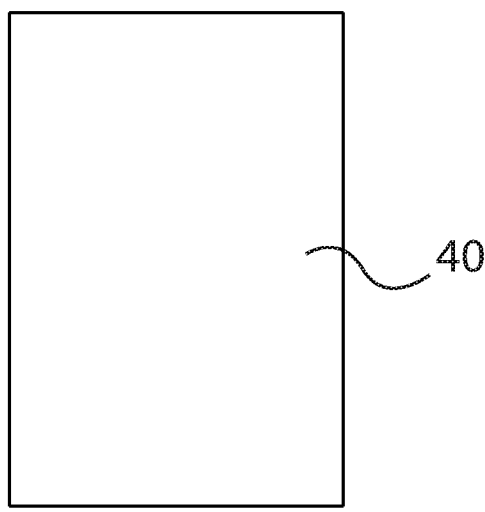
FIG. 4a is a top plan view of the rocking platform in FIGS. 3a and 3b.
Figure 4B:
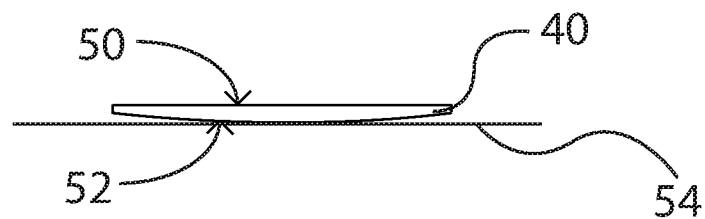
Figure 4C:
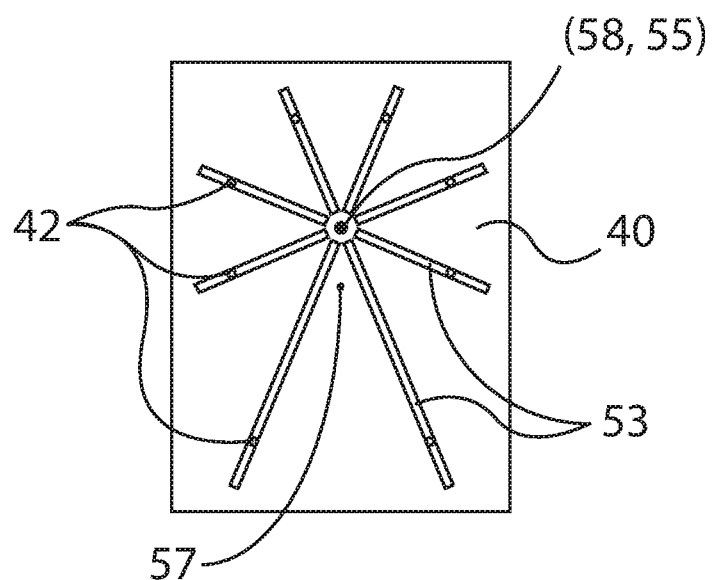
Figure 5A:
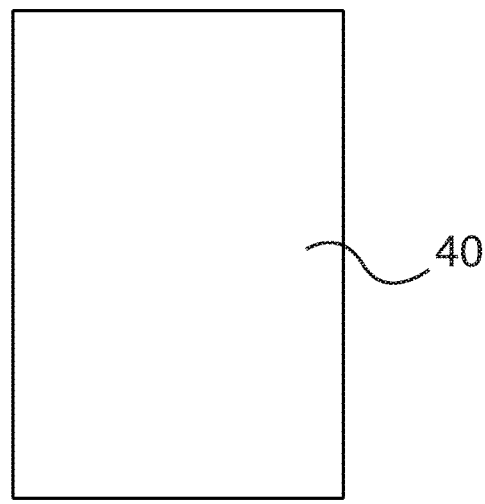
FIG. 5a is a top plan view of another embodiment of a rocking platform that may be used in conjunction with the system of FIG. 1.
Figures 5B, 5C:
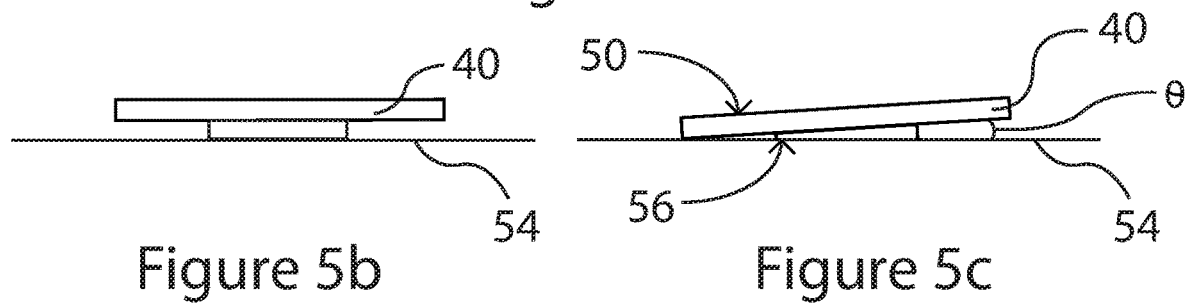
FIG. 5b is a side view of the rocking platform in FIG. 5a in an unrocked state.
FIG. 5c is a side view of the rocking platform in FIG. 5a in a rocked state.
Figure 5D:
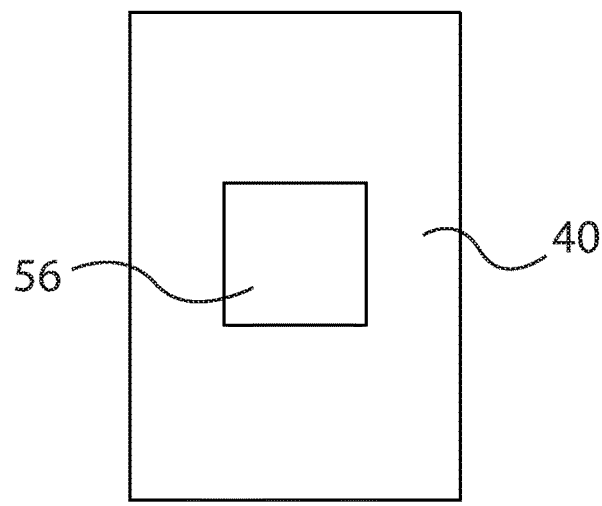
Figure 6A:
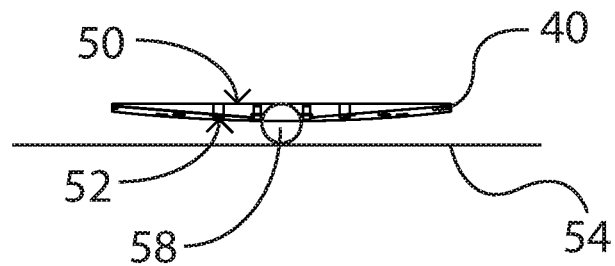
FIG. 6a is a side view showing a motion enhancing base element that may be used with the rocking platform of FIGS. 4a-c.
Figure 6B:
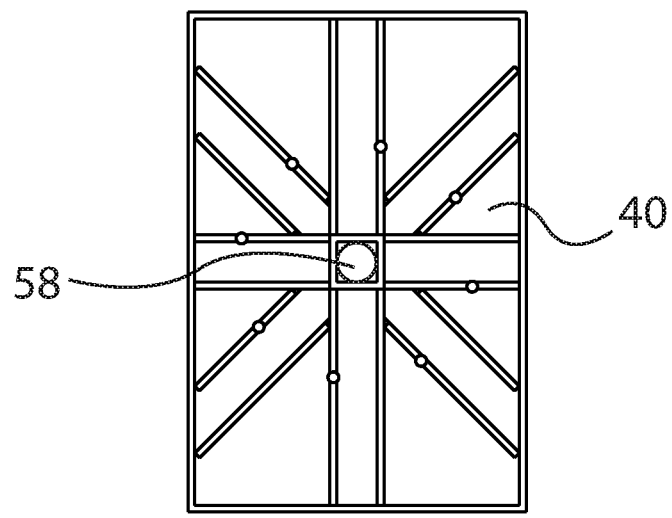

In one embodiment, rocking platform 40 has a generally flat top surface 50 and a curved rocking surface 52, FIGS. 4a-4c. Rocking platform 40 top surface may be wide enough front to back and side to side to accommodate interactive objects such as medium-sized cardboard packing box or small mat or rug, supporting user 22. Multiple rocking strips 53 are affixed to underside of rocking platform 40. Rocking strips 53 may be arranged in a radial pattern, ergonomically placed such that rocking center point 55 is located forward of rocking platform center 57, to align with center of gravity of user 22. In another embodiment, rocking strips may be arranged in parallel pairs, allowing user 22 to rock primarily front to back, side to side and diagonally, FIGS. 6b, 7a, 7b and 7c. The generally flat top surface 50 is for the user 22 to sit, stand or kneel upon. As user 22 shifts their weight from side-to-side or back-and-forth, rocking platform 40 rocks on supporting surface 54, by means of rocking strips 53. Rocking strip 53 arrangement affords user 22 ability to rock in any direction, 360 degrees around center of radial pattern. Tilt sensors 42 sense changes in the angular tilt θ of rocking platform 40 and send tilt sensor data about the angular tilt to control unit 46. In another embodiment, rocking platform 40 may include a small compressive element 56, FIGS. 5a-5d, allowing rocking platform to rock against supporting surface 54. One or more tilt sensors 42 and position sensors 44 may be mounted to rocking platform 40. Motion enhancing base element 58 may be interfaced with rocking platform 40. Motion enhancing base element 58 may restrict sideways movement of rocking platform 40 relative to supporting surface 54. Motion enhancing base element 58 may be a curved surface that accentuates the magnitude of tilt that rocking platform 40 can undergo, FIGS. 6a and 6b.

Figures 3A, 3B:
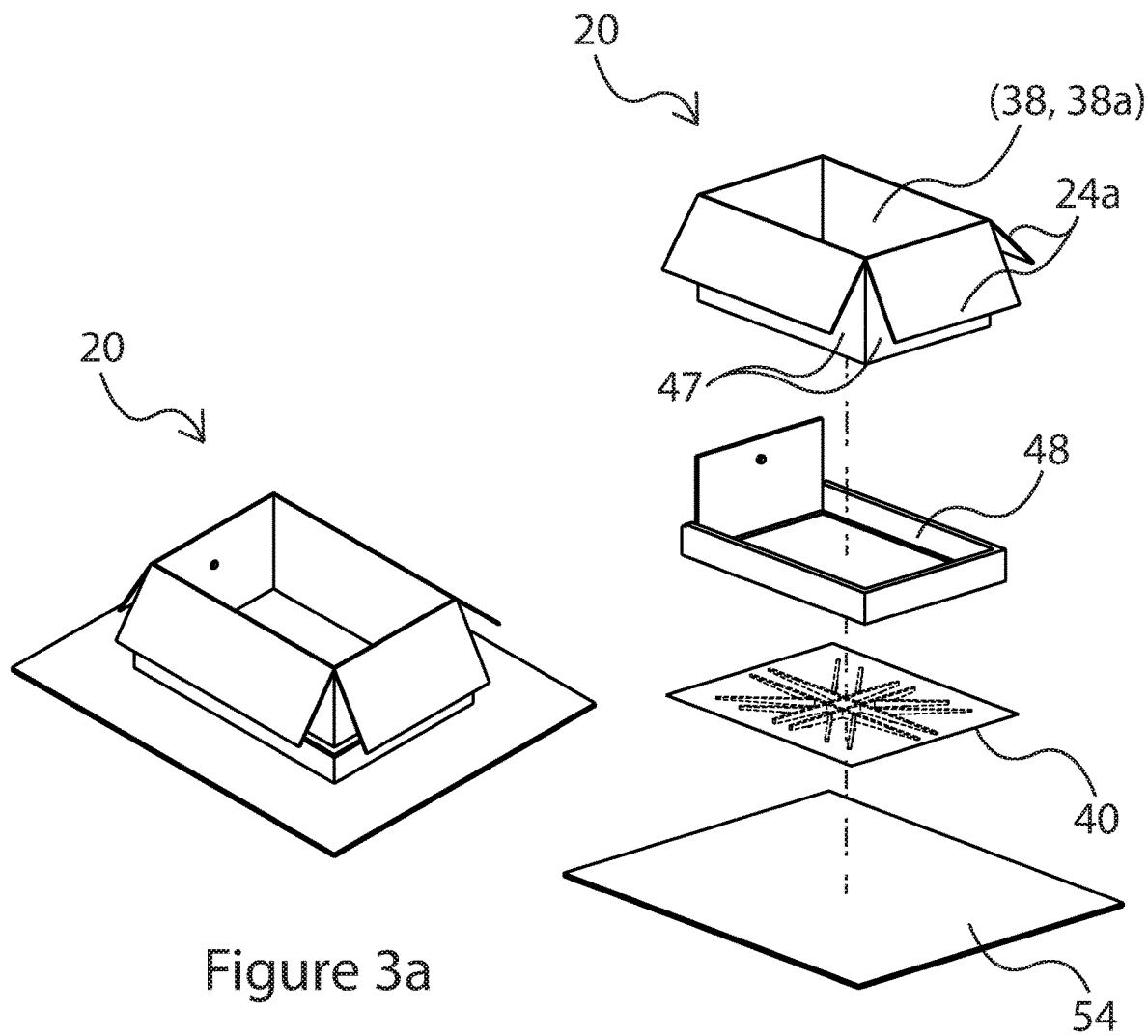

Cradling element 48, FIGS. 3a and 3b, may interface rocking platform 40 with interactive object 38 providing support, stability, and optionally supporting sensors (42, 43, 44). Cradling element 48 may consist of a flat rectangular bottom, affixed to top of rocking platform 40. Cradling element 48 may further consist of one or more thin planar sides perpendicular to rectangular bottom. Planar sides may support one or more sensors (42, 43, 44). Cradling element 48 may accommodate insertion of interactive element 38, in embodiments such as cardboard box, pillow, or rug.

Tilt sensor(s) 42 measures tilt of rocking platform 40 in a horizontal plane relative to support surface 54. In one embodiment tilt sensor 42 may be an accelerometer, similar to those used in cell phones, tracking the orientation of the rocking platform in three angular dimensions. In an alternative embodiment, tilt sensor 42 may consist of multiple pressure sensors positioned such that they are triggered by rocking platform 40 rocking in various directions, making contact with supporting surface 54 (or floor). Signals from multiple pressure/tilt sensors are interpolated by control unit 46 to determine direction of tilt. In still another embodiment tilt sensing may also be accomplished by tethering rocking platform 40 at various points to base using stretch sensors which sense tension in a rubber cord. Changes in tension on multiple cords then indicate tilt of rocking platform. Signals from multiple stretch sensors are interpolated by control unit 46 to determine direction of tilt. Although several embodiments for measuring tilt have been disclosed, it is understood that many other sensor arrangements are possible for sensing tilt. Examples of tilt data collected may be orientation, pressure, and/or tension. The tilt data is transmitted to control unit 46 by wired transmission or by wireless transmitters and receivers.

Position sensor 44 measures position of body positional element 24 relative to rocking platform 40. Positions sensors may be accelerometers, pressure switches, and stretch sensors as disclosed above for tilt sensors 42; however, the final measurement is position of body positional element 24 relative to rocking platform 40 instead of tilt. In another embodiment, proximity sensors may also be used. These proximity sensors use sound pulses to measure the distance from sensor to body positional element 24. In another embodiment, a sensor may use projected points of infrared light in conjunction with image processing algorithms to track position of various points of the user's body in three dimensions. Examples of position data collected may be proximity, orientation, pressure, and/or tension. The position data is transmitted to control unit 46 by wired transmission or by wireless transmitters and receivers.

Figure 7A:
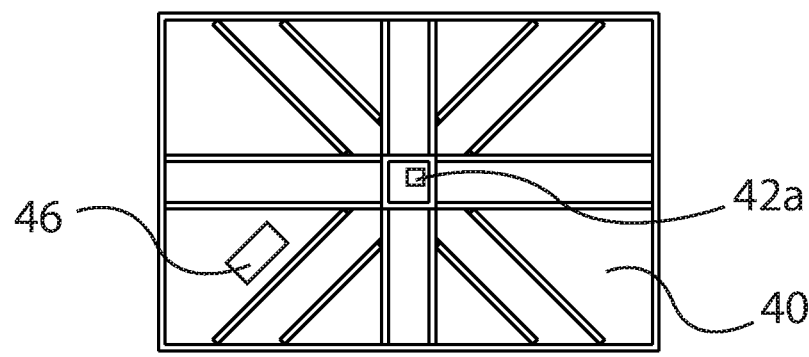
FIG. 7a is a plan view of a portion of the body motion driven interface system of FIG. 1, showing one embodiment for the locations of tilt sensors as attached to the rocking platform.
Figure 7B:
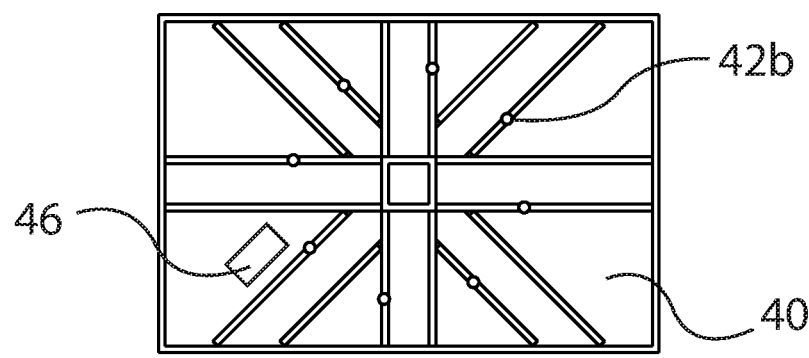
FIG. 7b is a plan view of a portion of the body motion driven interface system of FIG. 1, showing another embodiment for the locations of tilt sensors as attached to the rocking platform.
Figure 7C:
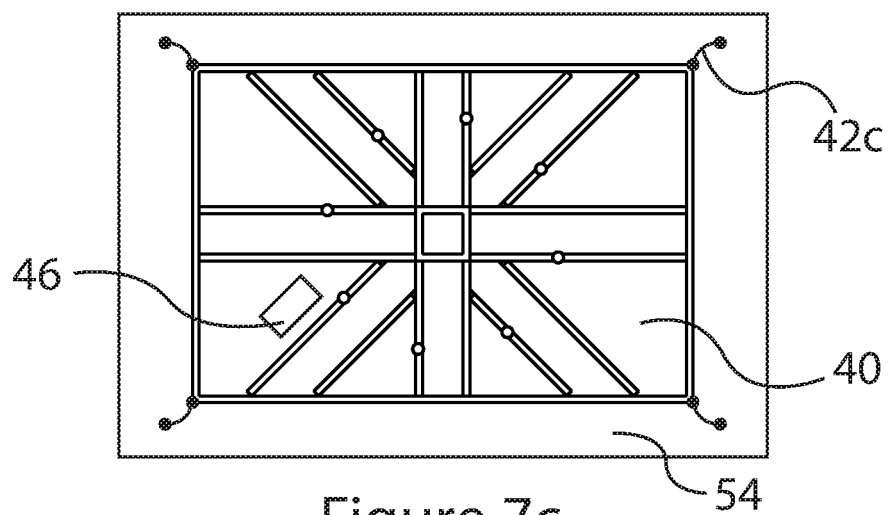
FIG. 7c is a plan view of a portion of the body motion driven interface system of FIG. 1, showing another embodiment for the locations of tilt sensors as attached to the rocking platform.

As shown in FIG. 7a, in one implementation of tilt sensor 42, accelerometer tilt sensor 42a may be attached to rocking platform 40 such that accelerometer tilt sensor 42a tilts along with platform 40. Accelerometer tilt sensor 42a is located near the middle, although exact placement is not crucial. As rocking platform 40 tilts, accelerometer tilt sensor 42a registers angle of tilt in two or three dimensions, and transmits this data to control unit 46, via either wired or wireless connection (not shown). In a second implementation, FIG. 7b, multiple switch tilt sensors 42b are placed under rocking platform 40 such that individual switches engage depending on direction of tilt. Switch tilt sensors 42b transmit on/off data to control unit 46, via either wired or wireless connection (not shown). In yet another implementation, FIG. 7c, stretch tilt sensors 42c tether rocking platform 40 at several points. As rocking platform 40 tilts, each sensor registers a different amount of tension. Stretch tilt sensors 42c transmit tension data to control unit 46, via either wired or wireless connection (not shown).

Figure 8:
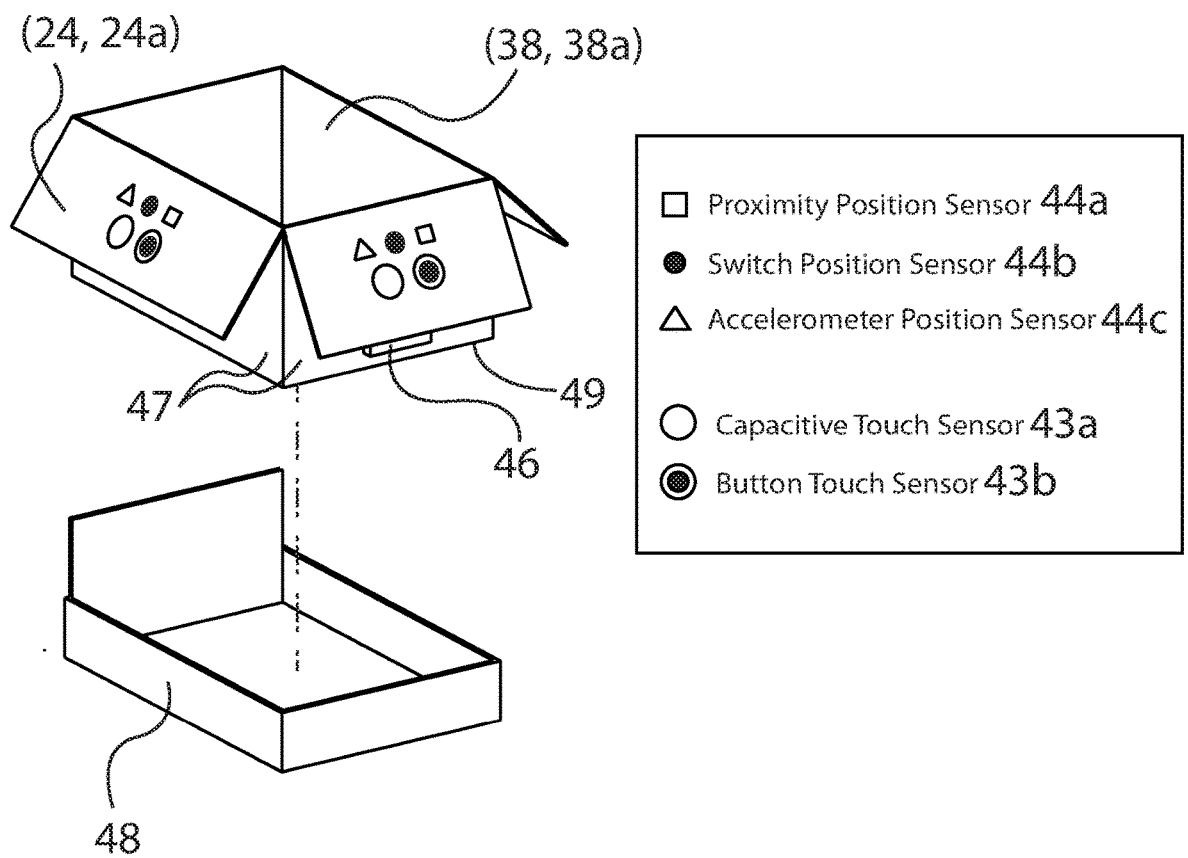
FIG. 8 is an exploded view of a portion of the body motion driven interface system of FIG. 1, showing one embodiment for the locations of position and tactile sensors as attached to interactive object.

FIG. 8, shows the potential placement of each type of potential position sensors onto interactive object 38. In one implementation, proximity position sensors 44a may be attached to one or more flaps of interactive object 38. Proximity position sensor 44a uses a sonic pulse to measure distance from flap to side of interactive object 38. Distance may range from 0-inches (flap down position) to greater than 18 inches (flap up position). Proximity data are transmitted to control unit 46 via either wired or wireless connection (not shown). In another implementation, switch body position sensors 44b may be attached to one or more flaps of interactive object 38. Switch position sensor 44b is activated when the user 22 pinches or pushes down upon flap triggering switch. Switch position sensor may thereby detect flap within less than approximately 10 degrees from flap down position. Switch data are transmitted to control unit 46 via either wired or wireless connection (not shown). In another implementation, accelerometer position sensors 44c may be attached to one or more flaps 24a of interactive object 38. Accelerometer position sensor 44c measures the angle of flap 24a in respect to interactive object 38 while user 22 moves the flap. Angle data may range from 0 to 360 degrees, and are transmitted to control unit 46 via either wired or wireless connection (not shown). In addition to any position sensors, there may be capacitive tactile sensors 43a which when user 22 touches capacitive tactile sensor attached to interactive object 38 a signal is transmitted to control unit 46 via either wired or wireless connection (not shown). In another implementation, there may be button tactile sensors 43b which when user touches button tactile sensor 43b attached to interactive object 38 a signal is transmitted to control unit 46 via either wired or wireless connection (not shown).

Figure 9:
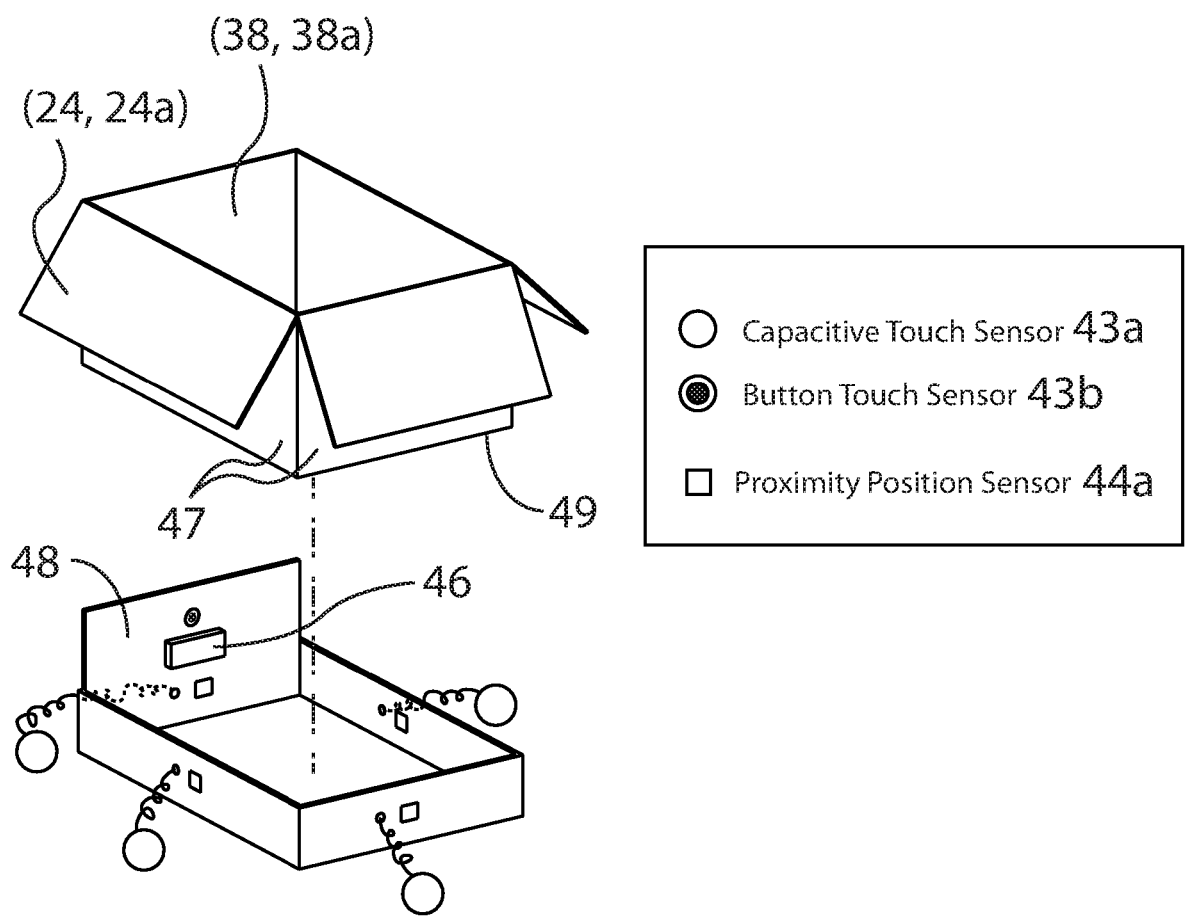
FIG. 9 is an exploded view of a portion of the body motion driven interface system of FIG. 1, showing one embodiment for the locations of position and tactile sensors as attached to the cradling element.
Figures 11A, 11B:
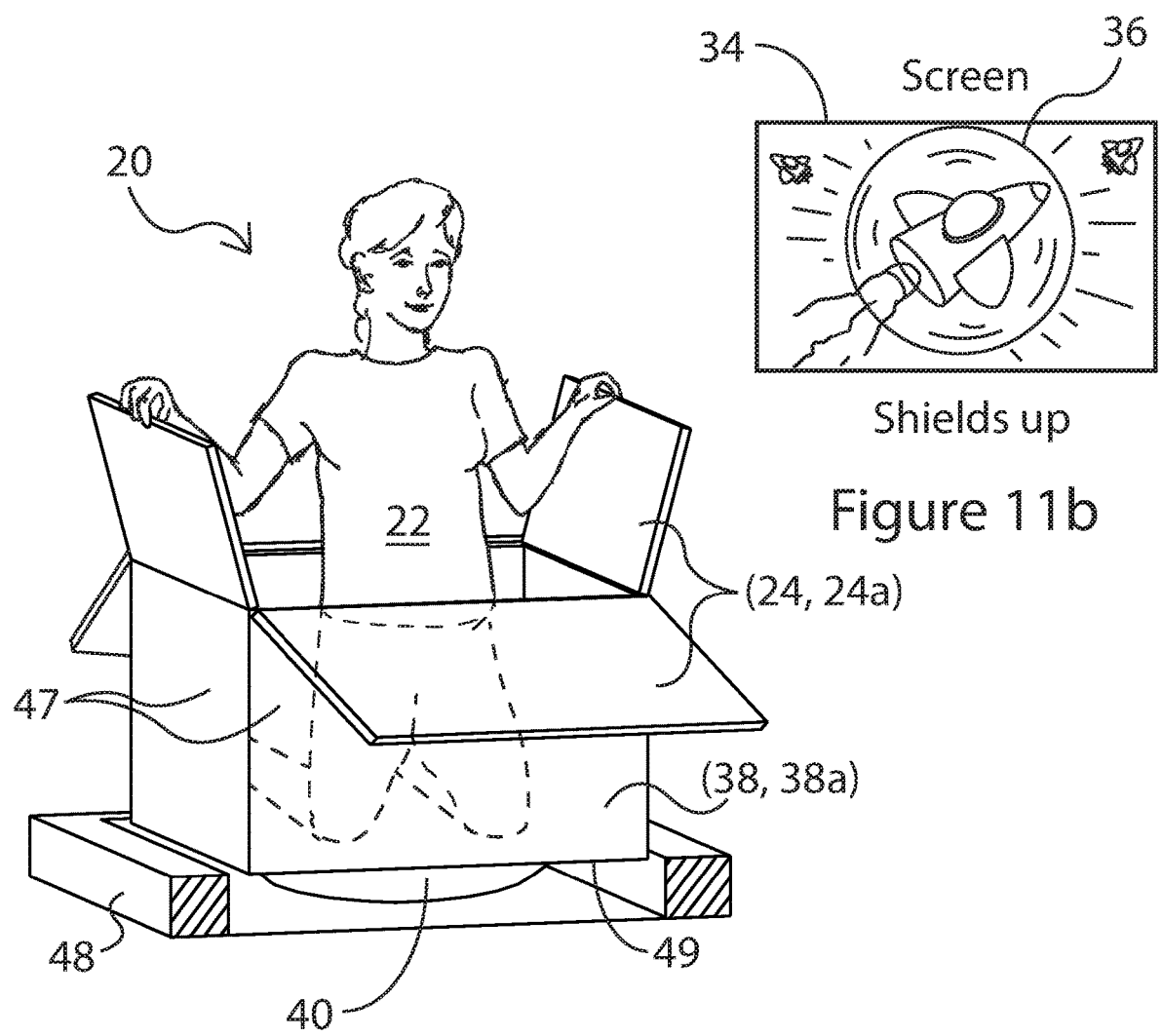

FIG. 9, shows the potential placement of each type of potential sensors 43, 44 onto cradling support element 48 when body motion driven interface system 20 has interactive object 38 interfaced with cradling support element 48. Sensors are activated in differing means as described below. In one implementation, capacitive tactile sensors 43a are anchored to cradling support element 48 such that when interactive object 38 is placed in cradling support element 48 the capacitive tactile sensors 43a are then attached by user 22 to interactive object 38. When user 22 touches capacitive tactile sensor 43a now attached to interactive object 38 a signal is transmitted to control unit 46 via either wired or wireless connection (not shown). In another implementation, there may be button tactile sensors 43b attached to the cradling support element 48 which when user 22 causes interactive object 38 to touch button tactile sensor 43b a signal is transmitted to control unit 46 via either wired or wireless connection (not shown). In addition to any tactile sensors 43, one or more proximity body position sensors 44a may be attached to cradling support element 48 such that a sonic pulse measures distance from interactive object 38 to cradling support element 48. Proximity data is transmitted to control unit 46 via either wired or wireless connection (not shown).

Control unit 46 may be one of several micro-controllers 50 or single-board computers capable of receiving digital and analog signals from sensors 42, 43 and 44. These controllers are programmed to translate the signals of sensor 42, 43 and 44 into a stream of ASCII characters and transmit those characters via communications channels to computing device 32 to therefore drive visual display 34. Examples of such devices include any of several versions of ARDUINO®, consisting of one of several versions of ATMEL® microcontroller, and circuitry to support various input/output protocols. Examples of applicable single-board computers include any of several versions of RASPBERRY PI®, consisting of one of several ARM-architecture computers. Control unit 46 may also receive signals from computing device 32 instructing control unit 46 to trigger one or more vibrating motors 60 affixed to one or more of rocking platform 40, cradling element 48, or interactive object 38. Vibrations provide haptic feedback to user 22 corresponding to specific interactions in the simulated reality produced by computing device 32.

Software enables visual display 34 to portray and reinforce user's 20 imagined representations of their actions. There are two kinds of software in body motion driven interface system 20, the first software resides in the control unit 46 and the second software resides in computing device 32. The first software in the control unit 46 collects data from the sensors (42, 43, 44) which are connected to control unit by narrow-gauge low-voltage wires, or by wireless communication. Control unit 46 software formats collected data into a stream of ASCII characters which are relayed to the computing device 32 by means of electronic cable, or by means of wireless communication. The second software translates positional and tilt data from control unit 46 into computing device 32 and then determines change of state 36 in computer driven visual display 34.

Generally, the whole body motion driven interface system 20 works together as follows: User 20 starts up the software application residing in computing device 32. User 20 then sits, stands, lies, or kneels on interactive object 38. By changing body position, and optionally manipulating body positional element 24; user 20 stimulates sensors (42, 43, 44) associated with rocking platform 40 and body positional element 24. Control unit 46 collects and translates sensor data using first software. Control unit 46 then transmits data to computing device 32 to thereby change the state of simulated reality shown on computer driven visual display 34. Using second software user 22 interacts with system 20 simultaneously imagining interactive object 38 and body positional element 24 to be elements in the simulated reality shown on computer driven visual display 34. The user's further interactions then become changes in state of the simulated reality. Because state of simulated reality is dependent on sensor data alone, user 22 may select interactive objects 38 from a variety of household items, so long as appropriate sensors (42, 43, 44) may be affixed to said objects to communicate relevant body-positional data to control unit 46. Control unit 46 may also be configured to automatically detect the type of interactive object 38 being used and the location of sensors (42, 42, 44) relative to each other.

Figures 12A, 12B:
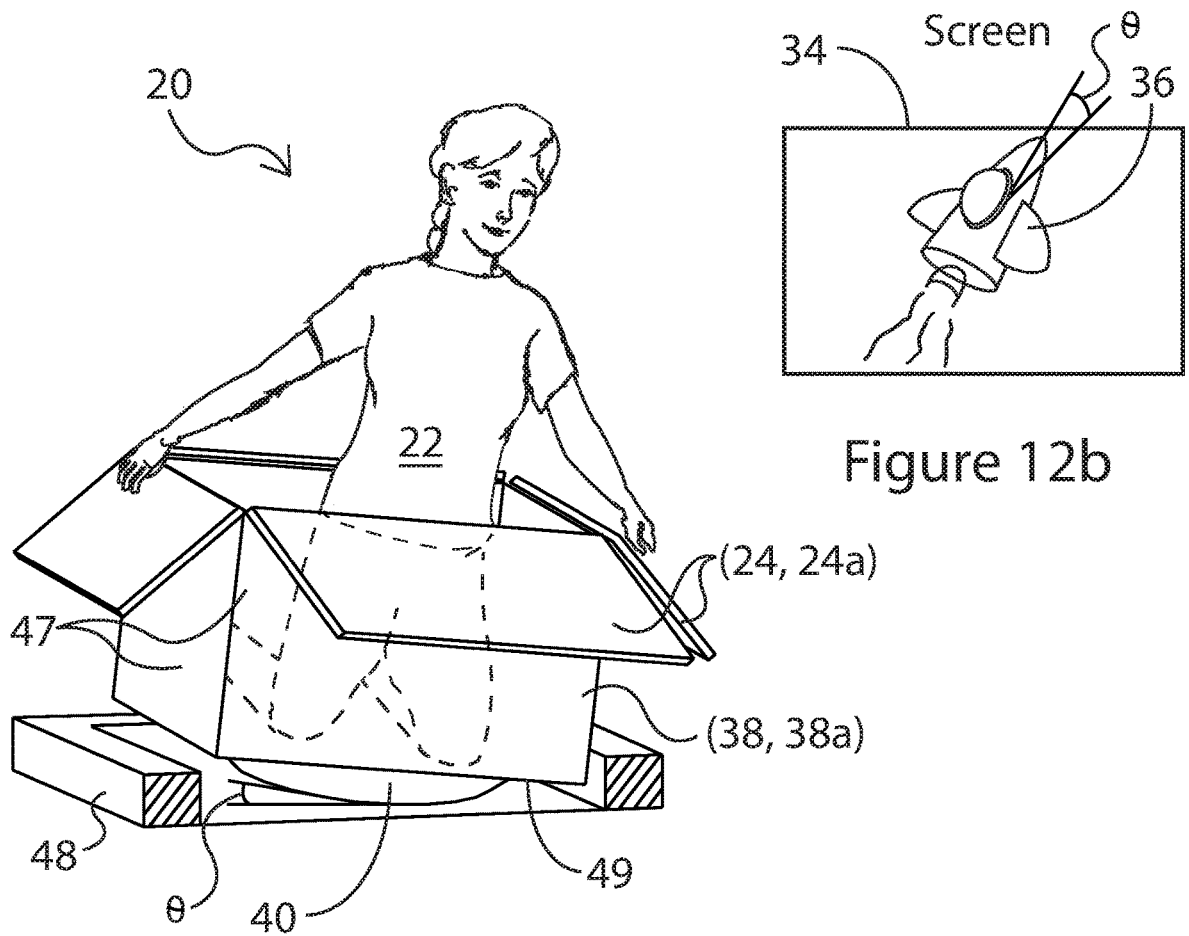
Figure 13A:
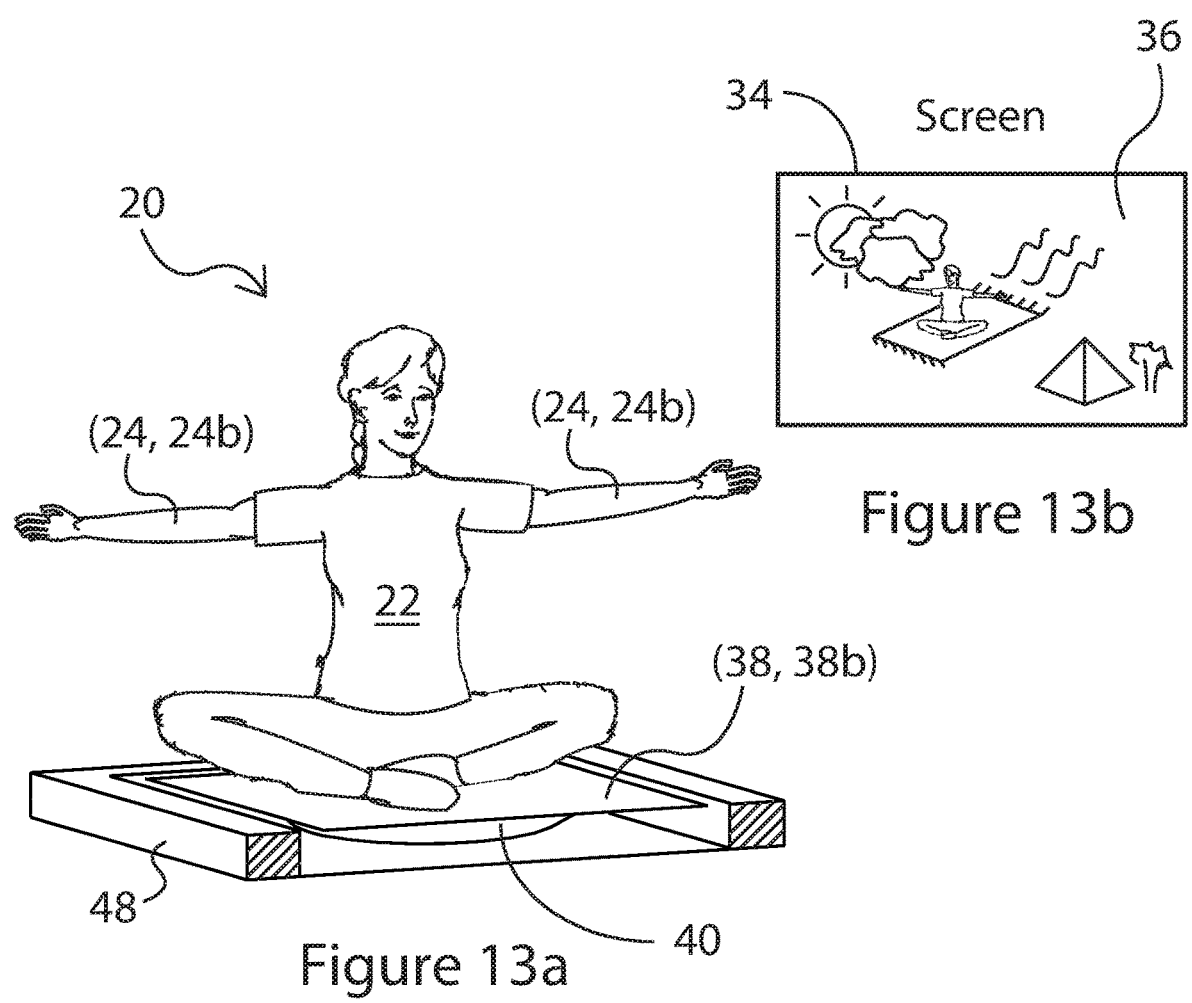
FIG. 13a is a perspective view of one embodiment of the body motion driven interface of FIG. 1 with the user in a first state.
Figure 13B:
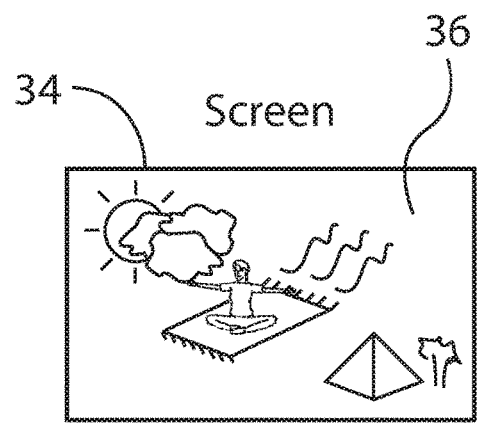
Figures 14A, 14B:
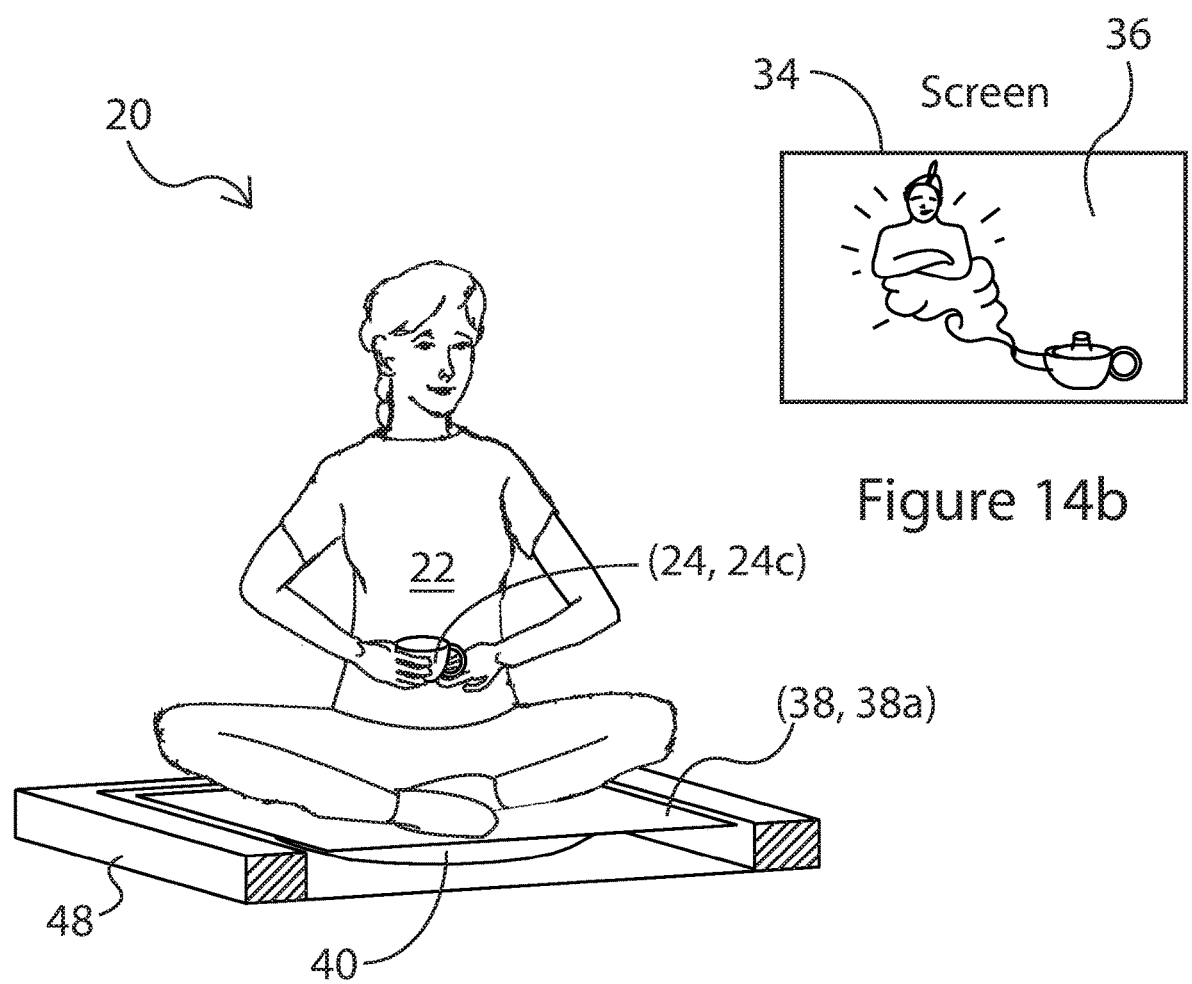

Examples of how body motion driven interface system 20 works is detailed in FIGS. 7a-11b. In a first example, FIG. 10a shows a user kneeling within a box 38a (one embodiment for interactive object 38) on top of rocking platform 40 in a first reality state. Body motion driven interface 30 senses tilt and position in this first reality state and generates the simulated reality state as seen in FIG. 10b. Positional sensor 44 senses box flaps 24a (a.k.a. body positional element 24) are down for box, which yields shields down for space ship in computer driven visual display 52. FIG. 11a shows user 22 moving box flaps 24a up creating a second reality state. Positional sensor 44 senses the box flaps are up and effect a change of state 36 in computer driven visual display as a second simulated reality state. Second simulated reality state shows shields are up for the space ship in computer driven visual display 34, FIG. 11b. FIG. 12a shows user 22 rocking the rocking platform 40. Tilt sensor 42 senses that rocking platform 40 has tilted θ to the left and effects a change of state 36 in computer driven visual display as a third simulated reality state. Third simulated reality state shows spaceship turns to the left θ', FIG. 12b. In a second example, FIG. 13a shows a user sitting within a carpet 38b (one embodiment for interactive object 38) on top of rocking platform 40 in a first reality state. Body motion driven interface 30 senses tilt and position in this first reality state and generates the simulated reality state as seen in FIG. 13b. Positional sensor 44 senses arms 24b (a.k.a. body positional element 24) are out, which yields flying for the carpet in computer driven visual display 34. FIG. 14a shows user 22 rubbing a cup 24c to create a second reality state. Positional sensor 44 senses the cup effect a change of state 36 in computer driven visual display as a second simulated reality state. Second simulated reality state shows a genie comes out of a lantern in computer driven visual display 34, FIG. 14b.

Body motion driven interface system provides for a body motion driven interface 30 that is imagined by user 20 to "become" a variety of vehicles, containers, or platforms. User's 20 experience is mediated by computing device 32 and portrayed on visual display 34.

While several embodiments of the invention, together with modifications thereof, have been described in detail herein and illustrated in the accompanying drawings, it will be evident that various further modifications are possible without departing from the scope of the invention. The scope of the claims should not be limited by the preferred embodiments set forth in the examples, but should be given the broadest interpretation consistent with the description as a whole.

What is claimed is:

1. A body motion driven interface system that uses at least one from the group consisting of a user's body position and a body positional element driven by a user's body to change a state within a computer driven visual display, comprising:
   a) rocking platform for supporting the user's body, said rocking platform having a front, back and a rocking point, said rocking point displaced off center of said rocking platform toward the front to provide an asymmetric ergonomic rocking surface, wherein said rocking platform includes rocking strips arranged radially from said rocking point, said rocking strips having differing lengths to create said ergonomic rocking surface;
   b) a tilt sensor for sensing tilt of the rocking platform;
   c) a position sensor for sensing position of the body positional element relative to the rocking platform;
   d) a control unit receiving tilt sensor data from said tilt sensor and position sensor data from said position sensor; and
   e) wherein said control unit uses said tilt sensor data and said position sensor data to generate instructions that change the state within the computer driven visual display.

2. The body motion driven interface system as recited in claim 1, further comprising an interactive object interfacing the user's body with said rocking platform.

3. The body motion driven interface system as recited in claim 2, wherein said interactive object is a box.

4. The body motion driven interface system as recited in claim 2, wherein said interactive object is an inflatable tube.

5. The body motion driven interface system as recited in claim 2, wherein said interactive object is a rug.

6. The body motion driven interface system as recited in claim 2, wherein said interactive object is a pillow.

7. The body motion driven interface system as recited in claim 2, further including a cradling element for supporting said interactive object.

8. The body motion driven interface system as recited in claim 2, wherein said position sensor is attached to said interactive object.

9. The body motion driven interface system as recited in claim 1, wherein said rocking platform has a generally flat top surface.

10. The body motion driven interface system as recited in claim 1, wherein said rocking platform has a curved rocking surface.

11. The body motion driven interface system as recited in claim 1, wherein said rocking platform includes a small compressive element allowing said rocking platform to rock against a support surface.

12. The body motion driven interface system as recited in claim 1, further comprising a motion enhancing base element.

13. The body motion driven interface system as recited in claim 12, wherein said motion enhancing base element restricts sideways movement of said rocking platform to a support surface.

14. The body motion driven interface system as recited in claim 12, wherein said motion enhancing base element is a curved surface that accentuates the magnitude of tilt that said rocking platform can undergo.

15. The body motion driven interface system as recited in claim 1, wherein said tilt sensor is attached to said rocking platform.

16. The body motion driven interface system as recited in claim 1, wherein said position sensor is attached to said rocking platform.

17. The body motion driven interface system as recited in claim 1, wherein said tilt sensor is an accelerometer.

18. The body motion driven interface system as recited in claim 1, wherein said tilt sensor is a tilt ball sensor.

19. The body motion driven interface system as recited in claim 1, wherein said tilt sensor is two or more pressure sensors.

20. The body motion driven interface system as recited in claim 1, wherein said position sensor is an accelerometer.

21. The body motion driven interface system as recited in claim 1, wherein said position sensor is a tilt ball sensor.

22. The body motion driven interface system as recited in claim 1, wherein said position sensor is an ultrasonic range finder.

23. The body motion driven interface system as recited in claim 1, wherein said position sensor is attached to an interactive object.

24. The body motion driven interface system as recited in claim 1, further comprising a tactile sensor for sensing the touch of the user's body.

25. The body motion driven interface system as recited in claim 24, wherein said tactile sensor is attached to a cradling element.

26. The body motion driven interface system as recited in claim 24, wherein said tactile sensor is a capacitive sensor.

27. The body motion driven interface system as recited in claim 24, wherein said tactile sensor is a push button.

28. The body motion driven interface as system recited in claim 1, wherein said control unit includes a microprocessor.

29. The body motion driven interface system as recited in claim 1, wherein said control unit includes at least one from the group consisting of said tilt sensor and said position sensor.

30. The body motion driven interface system as recited in claim 1, wherein said control unit includes a wireless transmitter.

31. The body motion driven interface system as recited in claim 1, further comprising the computer driven visual display.

32. The body motion driven interface system as recited in claim 1, further comprising a computing device.

33. The body motion driven interface system as recited in claim 1, further comprising the body positional element.

34. The body motion driven interface system as recited in claim 33, wherein the body positional element is a flap of a box.

35. The body motion driven interface system as recited in claim 33, wherein the body positional element is a hand held object.

36. The body motion driven interface system as recited in claim 1, wherein said control unit translates said tilt sensor data and said position sensor data into ASCII code for transmission to the computer driven visual display.

37. The body motion driven interface system as recited in claim 1, further comprising a vibrating motor to provide haptic feedback.

38. A body motion driven interface system that uses at least one from the group consisting of a user's body position and a body positional element driven by a user's body to change a state within a computer driven visual display, comprising:
   a) rocking platform for supporting the user's body, said rocking platform having a front, back and a rocking point, said rocking point displaced off center of said rocking platform toward the front to provide an asymmetric ergonomic rocking surface, wherein said rocking platform includes rocking strips arranged radially from said rocking point, said rocking strips having differing lengths to create said ergonomic rocking surface;
   b) a tilt sensor for sensing tilt of the rocking platform;
   c) a tactile sensor for sensing touch of the user's body;
   d) a control unit receiving tilt sensor data from said tilt sensor and tactile sensor data from said tactile sensor; and
   e) wherein said control unit uses said tilt sensor data and said tactile sensor data to generate instructions that change the state within the computer driven visual display.

39. A body motion driven interface system that uses at least one from the group consisting of a user's body position and a body positional element driven by a user's body to a change a state within a computer driven visual display, comprising:
   a) rocking platform for supporting the user's body, said rocking platform having a front, back and a rocking point, said rocking point displaced off center of said rocking platform toward the front to provide an asymmetric ergonomic rocking surface, wherein said rocking platform includes rocking strips arranged radially from said rocking point, said rocking strips having differing lengths to create said ergonomic rocking surface;
   b) a tilt sensor for sensing tilt of the rocking platform;
   c) a control unit receiving tilt sensor data from said tilt sensor; and d) wherein said control unit uses said tilt sensor data to generate instructions that change the state within the computer driven visual display.

40. The body motion driven interface system as recited in claim 39, wherein each rocking strip has said tilt sensor providing said tilt sensor data, wherein angular rotation is determined by interpolation of said tilt sensor data.

\* \* \* \* \*